INVENTORS
JOSEPH JAFFE
JAMES R. KITTRELL
BY
ATTORNEYS

United States Patent Office 3,535,229
Patented Oct. 20, 1970

3,535,229
HYDROCARBON CONVERSION CATALYST COM-
PRISING A SUBSTANTIALLY CATALYTIC MET-
ALS-FREE LAYERED CRYSTALLINE CLAY-TYPE
ALUMINOSILICATE COMPONENT IN A MATRIX
OF OTHER CATALYST COMPONENTS, AND
PROCESS USING SAID CATALYST
Joseph Jaffe, Berkeley, and James R. Kittrell, El Cerrito,
Calif., assignors to Chevron Research Company, San
Francisco, Calif., a corporation of Delaware
Continuation-in-part of application Ser. No. 750,038,
Aug. 5, 1968. This application Sept. 30, 1968, Ser.
No. 763,530
Int. Cl. C10g 13/00
U.S. Cl. 208—59                                    12 Claims

ABSTRACT OF THE DISCLOSURE

A catalyst comprising a layered crystalline clay-type aluminosilicate component substantially free of any catalytic metal or metals, a silica-containing gel component, and a hydrogenating component selected from rhenium and compounds of rhenium, and processes using said catalyst.

RELATED APPLICATION

Figure 1:
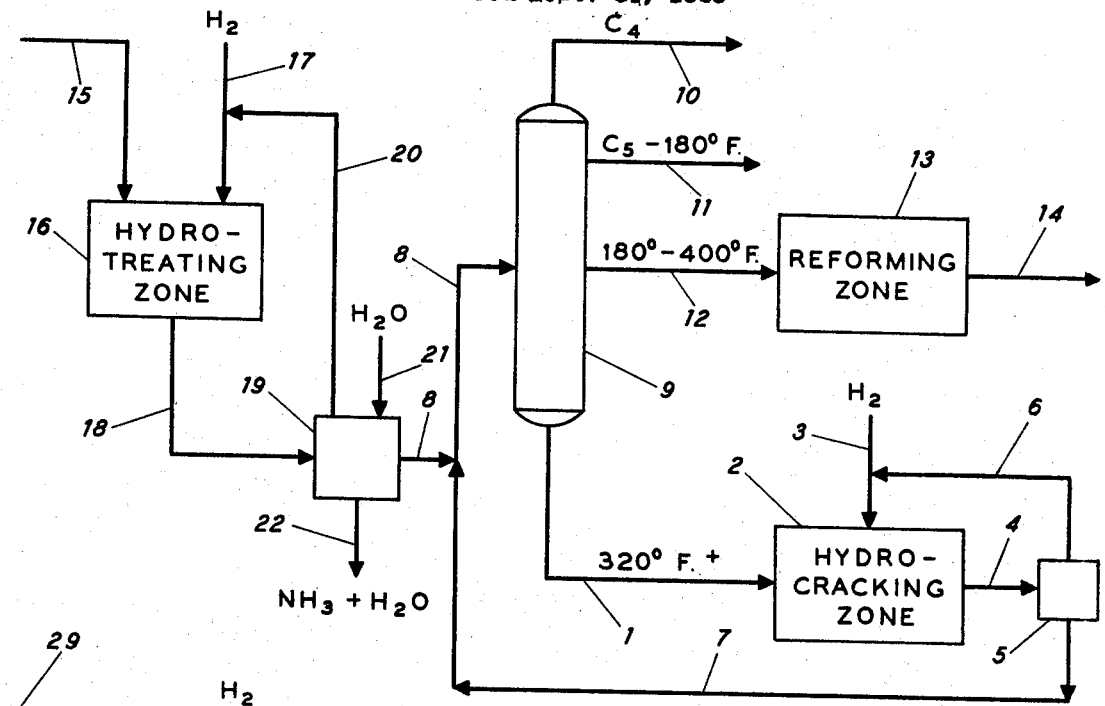

This application is a continuation-in-part of Joseph Jaffe application Ser. No. 750,038, for "Catalyst Comprising Rhenium and Layered Synthetic Crystalline Aluminosilicate, and Process Using Said Catalyst, filed Aug. 5, 1968.

This invention relates to catalytic hydrocracking of petroleum distillates and solvent-deasphalted residua to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. 3,236,761, for example, provides a particular type of decationized zeolitic molecular sieve catalyst; which may be used in some reactions without added metals, and in some reactions with added metals. The various applicable reactions are isomerization, reforming, cracking, polymerization, alkylation, dealkylation, hydrogenation, dehydrogenation and hydrocracking. Rhenium is named as a metal with which the molecular sieve may be loaded, but it is not clear from the patent which reactions such a catalyst would be used to catalyze. No example of a rhenium-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the noble metals, and the absence of any interest in rhenium except a passing mention, there is no guide in the patent either as to the applicability of a rhenium-molecular sieve catalyst for the hydrocracking reaction in particular, or to the amount of rhenium such a catalyst should contain, or to the hydrocracking results that might be expected.

It is also known in the art to use 2 weight percent rhenium in association with a gel-type silica-alumina cracking component for the hydrocracking of hydrocarbon fractions. For example, Wilson U.S. Pat. 3,278,418 makes such a disclosure. However, it is also known that such a catalyst has low hydrocracking activity, and that a promoter must be used with the rhenium to provide a catalyst having acceptable activity. Accordingly, the Wilson patent indicates that the rhenium-silica-alumina catalyst of his Examples 1 and 2 had activity indices of 42 and 47, respectively, whereas with the addition of a silver promoter for the rhenium, activity indices as high as 95 could be achieved. The data in the Wilson patent indicate that with rhenium levels as high as 2 weight percent, the rhenium-silica-alumina hydrocracking catalyst had only moderate activity. A higher hydrocracking activity would have been obtained with a higher rhenium level, but the cost of rhenium makes higher levels undesirable. Wilson was able partially to solve the problem of maintaining low levels of rhenium and adequate hydrocracking activity by adding a second hydrogenation component— silver—to the catalyst. However, this was accomplished only at a sacrifice in catalyst stability. As correctly indicated by Wilson, a hydrocracking catalyst having a silica-alumina cracking component is extremely nitrogen-sensitive, and the hydrocarbon-feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known that conventional catalysts having a crystalline zeolitic molecular sieve cracking component and a platinum hydrogenating component are sulfur-sensitive, and that while they are more sensitive to organic sulfur compounds they also are sensitive to H$_2$S. In each case the sulfur acts as a poison, particularly for the hydrogenation component, and reduces the hydrogenation activity of the catalyst, which in turn increases the fouling susceptibility of the catalyst.

It is also known, particularly from Granquist, U.S. Pat. 3,252,757, that a relatively new crystalline aluminosilicate that has been synthesized has the empirical formula

$$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of F−, OH−, ½O−− and mixtures thereof, and is internal in the lattice, and
$x$ is from 2.0 to 3.5 at 50% relative humidity, said mineral being characterized by a $d_{001}$ spacing at said humidity within the range which extends from a lower of about 10.4 A. to an upper limit of about 12.0 A. when A is monovalent, to about 14.7 A. when A is divalent, and to a value intermediate between 12.0 A. and 14.7 A. when A includes both monovalent and divalent cations.

Said aluminosilicate mineral, in the dehydrated form, is known from U.S. Pat. 3,252,889 to have application as a component of a catalytic cracking catalyst; however, applications of said mineral as a component of a hydrocracking catalyst have not been disclosed in the literature prior to the filing date of this application.

OBJECTS

In view of the foregoing, objects of the present invention include providing a novel catalyst useful for hydrocracking, and a novel hydrocracking process using said catalyst, said catalyst:

(1) Having a cracking component less sensitive to nitrogen poisoning than silica-alumina gel;

(2) Having a cracking component that is crystalline in structure, having pores elongated in two directions, contrary to the pores of crystalline zeolitic molecular sieves, and therefore having less reactant access limitations than the pores of such molecular sieves;

(3) Having a hydrogenating component at least as insensitive to sulfur poisoning as platinum;

(4) Having a high hydrocracking activity with economically low levels of the hydrogenating component;

(5) Having a hydrogenating component that can be used at the same low levels as can the prior art noble metals, but that is generally less costly than those noble metals;

(6) Having a high stability with said low levels of hydrogenating component, even in the presence of an additional hydrogenating component.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

Figure 2:
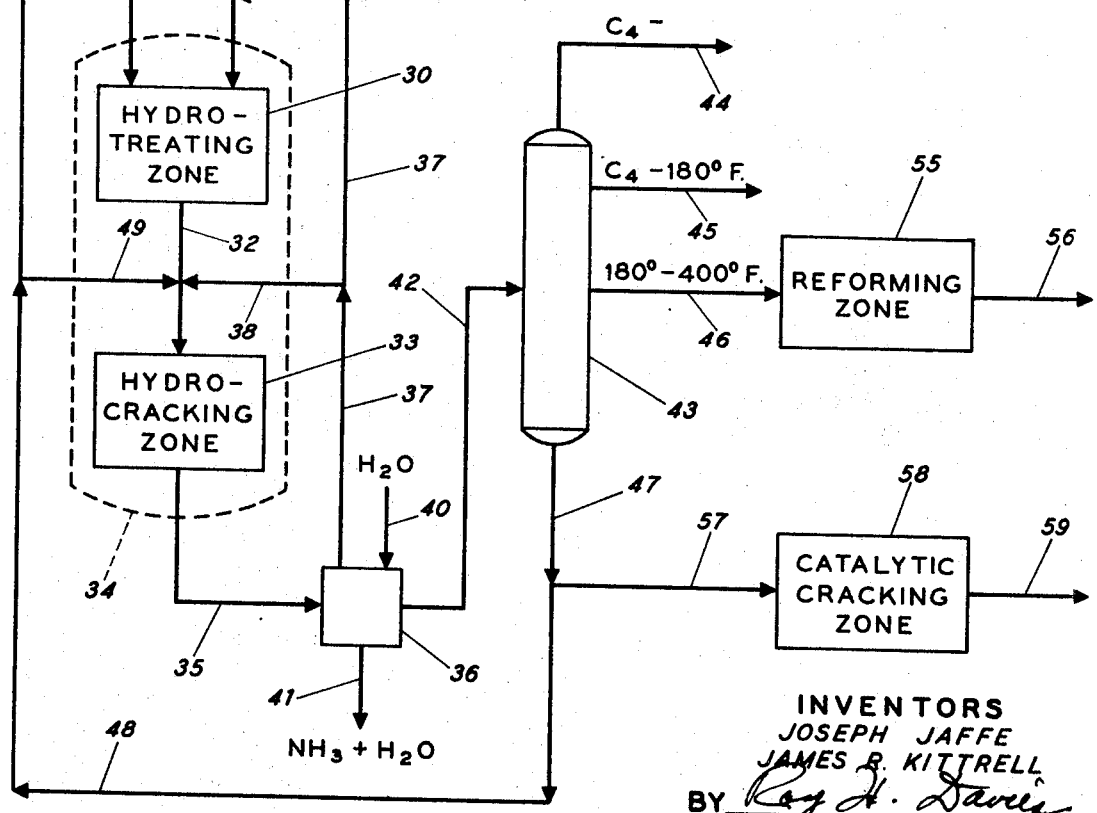

In the drawing, FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

STATEMENT OF INVENTION

It has been found that a catalyst comprising a layered, clay-type, crystalline aluminosilicate mineral, for example a dehydrated form of the mineral of Granquist U.S. Pat. 3,252,757, substantially in the ammonia or hydrogen form and substantially free of any catalytic loading metal or metals, and further comprising a silica-containing gel, preferably silica-alumina, and a rhenium or rhenium-compound hydrogenating component in an amount of 0.01 to 3.0 weight percent, calculated as metal and based on said cracking component, has all of the desirable catalyst attributes listed under "Objects" above and, therefore, in accordance with the present invention there is provided such a catalyst and a hydrocracking process using such a catalyst. It is not obvious from Rabo et al. U.S. Pat. 3,236,761 that a rhenium-crystalline zeolitic molecular sieve catalyst has application as a hydrocracking catalyst, or what rhenium levels such a catalyst should contain. It is even less obvious from Rabo et al. that not only should rhenium be used instead of a noble metal, but that a layered, crystalline, clay-type aluminosilicate mineral, for example the mineral of Granquist U.S. Pat. 3,252,757, could be used instead of a crystalline zeolitic molecular sieve. Even if such matters were clear from Rabo et al., Wilson U.S. Pat. 3,278,418 would lead a man skilled in the art to conclude that such a catalyst would either need to contain considerably more than 2 weight percent rhenium or that it must contain an additional hydrogenating component to obtain adequate hydrocracking activity. It has been found that neither of these conclusions is correct. Wilson also would lead a man skilled in the art to conclude, even if he considered use for hydrocracking of the catalyst used in the process of the present invention: (a) that it would need to contain an additional hydrogenating component in order to be able to maintain adequate hydrocracking activity at acceptably low rhenium levels; and (b) that such additional component would cause the catalyst stability to suffer markedly. These conclusions also are not correct. Accordingly, it has been found that the catalyst of the present invention surprisingly provides advantages over the Rabo et al. platinum or palladium on molecular sieve hydrocracking catalyst and the Wilson rhenium-silica-alumina hydrocracking catalyst, while unexpectedly being free from disadvantages that the art would lead one to expect.

In accordance with the present invention, therefore, there is provided a catalyst containing a unique combination of catalytic components in particular amounts, including a silica-containing gel component, preferably silica-alumina, a hydrogenating component selected from rhenium and compounds of rhenium, and a layered crystalline clay-type aluminosilicate component that is substantially in the ammonia or hydrogen form and that is substantially free of any catalytic loading metal or metals, said aluminosilicate having, prior to drying and calcining of said catalyst, the empirical formula:

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

One embodiment of the catalyst of the present invention comprises:

(A) A gel matrix comprising:

(a) at least 15 weight percent silica,
(b) alumina, in an amount providing an alumina-to-silica weight ratio of 15/85 to 80/20,
(c) rhenium or a compound of rhenium, in an amount of 0.3 to 5 weight percent, based on said catalyst, calculated as metal;

(B) A layer-type crystalline clay-type aluminosilicate substantially in the ammonia or hydrogen form, substantially free of any catalytic loading metal or metals, said aluminosilicate having, prior to drying and calcining of said catalyst, the empirical formula:

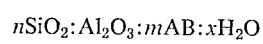

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations, said aluminosilicate further being in particulate form and being dispersed through said matrix; said catalyst being further characterized by an average pore diameter below 100 angstroms and a surface area above 200 square meters per gram.

Said clay-type aluminosilicate may be present in an amount of 1 to 50 weight percent of said catalyst.

In a further embodiment of the catalyst of the present invention, said gel matrix comprises nickel and/or tungsten, in the form of the metals, oxides, sulfides or any combination thereof. In addition, titanium, in the form of the metal, oxide or sulfide, may be present. Said titanium, when present, preferably is in the form of titania.

A further embodiment of the catalyst of the present invention comprises:

(A) A porous xerogel comprising:

(a) at least 15 weight percent silica,
(b) alumina, in an amount providing an alumina-to-silica weight ratio of 15/85 to 80/20,
(c) rhenium, in the form of metal, oxide, sulfide or any combination thereof, in an amount of 0.3 to 5 weight percent, based on said catalyst, calculated as metal,
(d) nickel, in the form of metal, oxide, sulfide or any combination thereof, in an amount of 1 to 10 weight percent, preferably 5 to 9 weight percent, of said xerogel, calculated as metal;

(B) A layer-type, crystalline, clay-type aluminosilicate in an amount of 1 to 50 weight percent of said catalyst, said aluminosilicate being substantially in the ammonia or hydrogen form, and being substantially free of any catalytic loading metal or metals, said aluminosilicate having, prior to drying and calcining of said catalyst, the empirical formula:

$$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a palue intermediate between 12.0 angstroms and 14.7 angstroms when A includes both monovalent and divalent cations, said aluminosilicate further being in the form of particles, said particles being dispersed through said xerogel; said catalyst having an average pore diameter below 100 angstroms and a surface area above 200 square meters per gram.

Still further in accordance with the present invention, there is provided a hydrotreating process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst described above, at hydrotreating conditions including a temperature in the range of 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said feedstock, and recovering hydrotreated products from said reaction zone.

The catalyst of the present invention is extremely tolerant of organic nitrogen as well as of ammonia, and is an efficient hydrodenitrification catalyst. The catalyst has excellent hydrocracking activity, and will accomplish hydrodenitrification and hydrocracking concurrently and efficiently. Accordingly, the catalyst may be used as: (a) a hydrodenitrification catalyst in a zone preceding a hydrocracking zone containing the catalyst of the present invention or a different hydrocracking catalyst; (b) a hydrocracking catalyst in a zone preceded by a hydrodenitrification zone containing a conventional hydrodenitrification catalyst; or (c) a single-stage hydrofining-hydrocracking catalyst.

A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The reference to a layered crystalline clay-type aluminosilicate "substantially free of any catalytic loading metal or metals" means that the clay-type aluminosilicate contains no more than 0.5 weight percent of catalytic metal or metals, based on the clay-type aluminosilicate. The catalytic metal or metals include the Group IV, VI, VII and VIII metals.

It will be noted that the weight ratio of catalytic metal in the non-clay-type aluminosilicate portion of the catalyst to catalytic metal in the clay-type aluminosilicate portion of the catalyst is high.

HYDROCARBON FEEDSTOCKS

The feedstocks supplied to the hydrocracking zone containing said catalyst comprising a layered synthetic crystalline aluminosilicate mineral in the process of the present invention are selected from the group consisting of petroleum distillates, solvent-deasphalted petroleum residual, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing said catalyst comprising a layered synthetic crystalline aluminosilicate mineral.

NITROGEN CONTENT OF FEEDSTOCKS

While the process of the present invention can be practiced with utility when supplying to the hydrocracking zone containing a catalyst comprising a layered synthetic crystalline aluminosilicate mineral, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million; more preferably, 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the layered synthetic crystalline aluminosilicate mineral component for organic nitrogen compounds, compared with silica-alumina, the hydrofining step need not accomplish complete organic nitrogen content reduction. Further, because of the superior tolerance of said component for ammonia, compared with silica-alumina, and because said component is more tolerant of ammonia than of organic nitrogen compounds, ammonia produced in the hydrofining zone either may be removed from the system between the hydrofining zone and the hydrocracking zone containing the hydrocracking catalyst comprising said component, or may be permitted to pass into the hydrocracking zone along with the feed thereto.

SULFUR CONTENT OF FEEDSTOCKS

While the process of the present invention can be practiced with utility when supplying to the hydrocracking zone, containing a catalyst comprising a layered synthetic crystalline aluminosilicate mineral, hydrocarbon feeds containing relatively large quantities of organic sulfur, it is preferable to maintain the organic sulfur content of the feed to that zone in a range of 0 to 3 weight percent, preferably 0 to 1 weight percent.

Catalyst comprising a layered synthetic crystalline aluminosilicate mineral component and a rhenium or rhenium-compound hydrogenating component (A) General.—The layered synthetic crystalline aluminosilicate mineral cracking component used in preparing the catalyst is adequately described above and in Granquist U.S. Patent 3,252,757. The mineral becomes dehydrated during drying and calcination of the catalyst, as in the examples herein. This component may be present in the catalyst in an amount of 10 to 99.9 weight percent, based on the total catalyst.

The rhenium hydrogenating component of the catalyst may be present in the final catalyst in the form of the metal, metal oxide, metal sulfide, or a combination thereof. The rhenium will be present in an amount of 0.01 to 3.0 weight percent, based on said cracking component and calculated as the metal.

A conventional crystalline zeolitic molecular sieve cracking component may be included in the catalyst, and such cracking component may be of any type that is known in the art as a useful component of a conventional hydrocracking catalyst comprising a noble metal or noble metal-compound hydrogenating component. A decationized molecular sieve cracking component is preferred. Especially suitable are faujasite, particularly Y type and X type faujasite, and mordenite, in the ammonia form, hydrogen form, alkaline earth-exchanged form, or rare earth-exchanged form. Preferably said molecular sieve component when present, like the clay-type aluminosilicate component, will be substantially free of any catalytic metal or metals.

A preferred catalyst comprises said layered, substantially catalytic metals-free, clay-type crystalline aluminosilicate mineral cracking component intimately dispersed in particulate form in a matrix of other catalytic components comprising a silica-containing gel, preferably silica-alumina, a hydrogenating component selected from the group consisting of Group VI metals and compounds thereof and Group VIII metals and compounds thereof, and rhenium or compounds thereof. Examples of suitable matrices include matrices comprising rhenium and a compound thereof and: (a) silica-alumina; (b) nickel or a compound thereof and silica-alumina; (c) nickel or a compound thereof and tin or a compound thereof and silica-alumina; (d) nickel or a compound thereof and tungsten or a compound thereof and silica-alumina; (e) nickel or a compound thereof and molybdenum or a compound thereof and silica-alumina; (f) nickel or a compound thereof and tungsten or a compound thereof and titania and silica-alumina; and (g) nickel or a compound thereof and molybdenum or a compound thereof and titania and silica-alumina; any of the foregoing with the addition of fluorine or a compound thereof. The layered clay-type aluminosilicate also may contain fluorine, and further desirably will contain water, as discussed hereinafter. If desired, the Group VIII metal may be cobalt, platinum, palladium or iridium, or compounds of cobalt, platinum, palladium or iridium.

(B) Method of preparation.—The layered synthetic crystalline aluminosilicate mineral cracking component of the catalyst may be prepared in the manner set forth in Granquist U.S. Pat. 3,252,757.

The rhenium compound used generally will contain rhenium in anionic form. The compound should be one that is soluble in water, and that contains no ions that are known as contaminants in hydrocracking catalysts. Suitable rhenium compounds are perrhenic acid, $HReO_4$, and ammonium perrhenate, $NH_4ReO_4$. An ammoniacal solution of rhenium heptoxide also may be used.

The layered clay-type crystalline aluminosilicate component may be dispersed in a matrix of the other catalyst components by cogelation of said other components around said aluminosilicate component in a conventional manner.

The layered, clay-type crystalline alumino-silicate component, substantially in the ammonia or hydrogen form, may be maintained substantially free of any catalytic loading metal or metals, as required by the present invention, by dispersing it, substantially free of any catalytic loading metal or metals, in a slurry of the precursors of the other catalyst components at a pH of 5 to 7. When a sodium form of clay-type aluminosilicate is one of the starting materials, it may be converted to the ammonia or hydrogen form by ion exchange prior to being combined with the other catalyst components. Alternatively, it may be combined with the other catalyst components and then converted to the ammonia or hydrogen form by ion exchange. In either case, the clay-type aluminosilicate component should not be combined with the precursors of the other catalyst components at a pH below 5.

The catalyst, in hydrogel form, is dried in a conventional manner, and then desirably is activated in a flowing oxygen-containing gas stream, which may be air, at 900° to 1150° F. for 0.5 to 20 hours. Desirably the catalyst is rehydrated after the drying and activation steps by combining it with at least 0.1, preferably 0.1 to 1.0, ml. of water per gram of clay-type aluminosilicate. Preferably said catalyst is maintained in this rehydrated state during at least the major portions of the on-stream periods while being used in the process of the present invention.

The finished catalyst may be sulfided in a conventional manner prior to use, if desired. If not presulfided, the catalyst will tend to become sulfided during process operation if the sulfur content of the hydrocarbon feed is appreciable.

Separate hydrofining catalyst (A) General.—As previously indicated, advantageous results are obtained by providing in the reaction zone containing the hydrocracking catalyst comprising rhenium or a compound thereof and a layered synthetic crystalline aluminosilicate mineral cracking component a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed the bed of separate second catalyst is located above said hydrocracking catalyst in the same reactor shell.

Where said separate second catalyst is located in the same reactor shell as said hydrocracking catalyst containing a clay-type aluminosilicate, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| | Percent by weight of total catalyst, calculated as metal | | | $SiO_2/Al_2O_3$ weight ratio |
|---|---|---|---|---|
| | Ni | Mo | W | |
| (1) | 4–10 | 15–25 | | 10/90–30/70 |
| (2) | 6–15 | | 15–30 | 30/70–50/50 |

It has been found that use of said separate second catalyst increases the gasoline yield from the hydrocracking stage containing a catalyst comprising rhenium or a compound thereof, compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

(B) Method of preparation.—Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst comprising rhenium or a compound thereof and a layered synthetic crystalline aluminosilicate has activity and stability advantages over a hydrocracking catalyst consisting of rhenium and a gel-type silica-alumina. It has been found that use of said separate second catalyst in the above-described arrangements further increases the stability of the hydrocracking catalyst containing rhenium or a compound thereof and a layered synthetic crystalline aluminosilicate, compared with the stability of the latter catalyst when the identical feed thereto has not been first or concurrently processed in the presence of said separate second catalyst.

Operating conditions

The hydrocracking zone containing the catalyst comprising a layered synthetic crystalline aluminosilicate and rhenium or a compound of rhenium is operated at hydrocracking conditions including a temperature in the range 400° to 950° F., preferably 500 to 850° F., a pressure in the range 800 to 3,500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock Where a separate hydrofining zone, which also may accomplish hydrogenation and some hydrocracking, is located ahead of the hydrocracking zone containing a catalyst comprising a layered synthetic crystalline aluminosilicate and rhenium or a compound of rhenium, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst comprising a layered synthetic crystalline aluminosilicate and rhenium or a compound of rhenium in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

Process operation with reference to drawing

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising a substantially catalytic metals-free layered synthetic crystalline aluminosilicate mineral cracking component, a silica-containing gel component and 0.01 to 3.0 weight percent, based on said cracking component, of rhenium. As previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, $C_5$–180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst comprising a substantially catalytic metals-free layered synthetic crystalline aluminosilicate mineral cracking component, a silica-containing gel component, and 0.01 to 3.0 weight percent, based on said cracking component, of rhenium. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5$–180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the catalyst of the present invention, the preparation thereof, and the use thereof in the process of the present invention. The examples are not intended to limit the scope of the present invention.

Example 1

A rhenium-layered crystalline clay-type aluminosilicate catalyst (Catalyst A, a comparison catalyst) was prepared in the following manner.

These starting materials were used:

(1) 500 grams of a layered crystalline clay-type aluminosilicate mineral as described in Granquist U.S. Pat. 3,252,757;

(2) 1000 cc. of an aqueous solution of perrhenic acid ($HReO_4$), containing 10.8 grams of rhenium.

The clay-type aluminosilicate, in lumpy powder form, was introduced into a Hobart kitchen blender, followed by slow addition of the perrhenic acid solution while stirring, to form a pasty mass. The pasty mass was transferred to a dish and dried at 150° F. for approximately 16 hours. The resulting dried material was pressed through a 60-mesh screen to obtain fine granules. The granules were blended with a 1% Sterotex lubricant binder, and tabletted. The tablets were calcined in flowing air for 2 hours at 950° F. The tabletted, calcined rhenium-layered aluminosilicate material was crushed, and a resulting 8–16 mesh fraction thereof was separated for use as a comparison catalyst. This catalyst contained an amount of rhenium approaching the theoretical amount based on the amounts of ingredients used.

Example 2

A catalyst (Catalyst B, a comparison catalyst) consisting of a rhenium-impregnated layered crystalline clay-type aluminosilicate in a matrix of other catalytic components, is prepared. The final catalyst consists of 20% of the catalyst of Example 1 and 80% of a matrix containing nominally 8% nickel, 18% tungsten, 7% titanium dioxide, 30% alumina and 30% silica.

The catalyst of this example is prepared in the following manner:

(1) The impregnated clay-type aluminosilicate, metals, silica and alumina are combined in a solution.

(2) The solution is gelled by pH control.

(3) The resulting slurry is filtered, washed and dried.

(4) The dried filter cake is tabletted, calcined in flowing air for 5 hours, and crushed for use as a comparison catalyst.

Example 3

A cogelled catalyst (Catalyst C) of the following composition is prepared:

| Component: | Wt. percent of total catalyst |
|---|---|
| Re₂O₇ | 2.0 |
| Al₂O₃ | 27.0 |
| SiO₂ | 23.9 |
| Layered crystalline clay-type aluminosilicate | 47.1 |
| Total | 100.0 |

The catalyst of this example is prepared in the following manner:

(1) The clay-type aluminosilicate, a perrhenic acid solution, an aqueous sodium silicate solution and an aqueous aluminum chloride solution are combined at a pH above 5;

(2) The resulting solution is gelled at a pH above 5.

(3) The resulting slurry is filtered, washed and dried.

(4) The dried filter cake is crushed and calcined in flowing air for 5 hours.

The clay-type aluminosilicate component of the catalyst is substantially free of rhenium. By maintenance of the pH above 5, cationic components of hydrogenation metals do not load the clay-type aluminosilicate component. Where a rhenium compound such as perrhenic acid is used, the rhenium, being in the form of an anion in an aqueous solution, will not load the clay-type aluminosilicate component at a pH near 5.

Example 4

A cogelled catalyst (Catalyst D) of the following composition is prepared:

| Component: | Wt. percent of total catalyst |
|---|---|
| Re₂O₇ | 2.0 |
| NiO | 9.2 |
| Al₂O₃ | 27.0 |
| SiO₂ | 23.9 |
| Layered clay-type crystalline aluminosilicate | 37.9 |
| Total | 100.0 |

The catalyst is prepared by the following steps, using sufficient quantities of the various starting materials to produce the above-indicated weight percentages of the components of the final catalyst:

(1) An aqueous acidic solution is prepared, containing AlCl₃, NiCl₂, acetic acid, and perrhenic acid;

(2) Two alkaline solutions are prepared: (1) an aqueous sodium silicate solution; and (2) ammonia solution containing sufficient excess ammonia so that upon combining the alkaline solutions with the acidic solution coprecipitation of all of the metal-containing components of the solutions will occur at a neutral pH of about 7.

(3) The acidic and alkaline solutions are combined, and coprecipitation of all of the metal-containing components of the solutions occurs at a pH of about 7, resulting a slurry.

(4) A layered clay-type crystalline aluminosilicate in finely divided form is added to the slurry.

(5) The clay-type aluminosilicate-containing slurry is filtered to produce a clay-type aluminosilicate-containing hydrogel filter cake, which is washed repeatedly with dilute ammonium acetate solution, to remove sodium and chloride ionic impurities from both the hydrogel and the clay-type aluminosilicate contained therein.

(6) The clay-type aluminosilicate-containing hydrogel is dried in an air-circulating oven and then is activated in flowing air for 5 hours at 950° F.

The finished catalyst is characterized by a surface area above 300 M²/g., a pore volume above 0.3 cc./g., and an average pore diameter above 30 angstroms, and a clay-type aluminosilicate component substantially free of catalytic metals; that is, substantially all of the nickel and rhenium contained in the catalyst is located in the gel portion of the catalyst rather than in the clay-type aluminosilicate component thereof.

Example 5

A catalyst (Catalyst E) consisting of a layered clay-type crystalline aluminosilicate in a rhenium-containing matrix is prepared. The final catalyst consists of 20% of said clay-type aluminosilicate, and 80% of a matrix containing nominally 1% rhenium, 8% nickel, 17% tungsten, 7% titanium dioxide, 30% alumina and 30% silica. The catalyst is prepared in the manner described in Example 4; in particular the pH of the combined solution is maintained near 7 to insure that the clay-type aluminosilicate component of the final catalyst will be substantially free of any catalytic metal or metals.

Example 6

Catalyst B of Example 2 is used to hydrocrack a light cycle oil hydrocarbon feedstock having the following properties:

| | |
|---|---|
| Gravity, ° API | 19.5 |
| Aniline point, ° F. | 62 |
| Sulfur content, weight percent | 0.43 |
| Nitrogen content, parts per million | 330 |
| Aromatics content, liquid volume percent | 70 |

| Boiling range | ASTM Distillation D–1160 |
|---|---|
| ST/5 | 381/471 |
| 10/30 | 492/532 |
| 50 | 568 |
| 70/90 | 598/635 |
| 95/EP | 648/681 |

The hydrocracking is accomplished on a recycle basis, at a per-pass conversion of 80 liquid volume percent to products boiling below 400° F., a total pressure of 1300 p.s.i.g., a liquid hourly space velocity of 0.9, and a total hydrogen supply rate of 5600 s.c.f. per barrel of hydrocarbon feedstock.

An identical run is made with Catalyst E of Example 5.

The activities and stabilities of these catalysts, as indicated respectively by the starting temperatures necessary to achieve, and the rate of temperature increase required to maintain, the indicated per-pass conversion, are as follows:

| | Catalyst B | Catalyst E |
|---|---|---|
| Starting T, ° F | 760 | 740 |
| Fouling Rate, ° F./hr | 0.1 | 0.1 |

Example 7

Catalyst A was used to hydrocrack a hydrofined light cycle oil having the properties:

| | |
|---|---|
| Gravity, ° API | 30.1 |
| Aniline point, ° F. | 129.7 |
| Sulfur content, p.p.m. | 10 |
| Nitrogen content, p.p.m. | 0.3 |

| Boiling range | ASTM Distillation D–1160 |
|---|---|
| ST/5 | 403/433 |
| 10/30 | 445/480 |
| 50 | 519 |
| 70/90 | 560/626 |
| 95/EP | 651/723 |

The hydrocracking was accomplished on a recycle basis, at a per-pass conversion of 60 liquid volume percent to products boiling below 400° F., a total pressure of 1200 p.s.i.g., a liquid hourly space velocity of 1.5 and a total hydrogen supply rate of 5600 s.c.f. per barrel of hydrocarbon feedstock.

Catalysts C, D and E are separately used to hydrocrack additional separate portions of the same light cycle oil.

The activities and stabilities of these catalysts, as indicated respectively by the starting temperature necessary to achieve, and rate of temperature increase required to maintain, the above per-pass conversion, are:

|  | Catalyst A | Catalyst C | Catalyst D | Catalyst E |
|---|---|---|---|---|
| Starting T, °F | 566 | 560 | 560 | 550 |
| Fouling rate, °F./hr. | 0.06 | 0.03 | 0.02 | 0.02 |

CONCLUSIONS

Applicants do not intend to be bound by any theory for the unexpectedly superior hydrofining and hydrocracking activity of the catalyst of the present invention, or for the unexpectedly superior hydrofining and hydrocracking stability of the catalyst. Applicants assume that the favorable results are largely attributable to, and unique to, the particular combination of catalytic components used, coupled with a relatively high ratio of catalytic metals in the non-clay-type aluminosilicate portion of the catalyst compared with the catalytic metals in the clay-type aluminosilicate portion of the catalyst, and further coupled with the low absolute amount of catalytic metals in the clay-type aluminosilicate portion of the catalyst.

Although only specific embodiments of the present invention have been described, numerous variations can be made in these embodiments without departing from the spirit of the invention, and all such variations which fall within the scope of the appended claims are intended to be embraced thereby.

What is claimed is:

1. A hydrocarbon conversion catalyst comprising silica, alumina, a hydrogenating component selected from rhenium and compounds of rhenium, and a layered crystalline clay-type aluminosilicate component that is substantially in the ammonia or hydrogen form and that is substantially free of any catalytic loading metal or metals, said aluminosilicate having, prior to drying and calcining of said catalyst, the empirical formula:

$$nSiO_2:Al_2O_3:mAB:xH_2O$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

2. A hydrocarbon conversion catalyst comprising:
(A) A gel matrix comprising:
  (a) at least 15 weight percent silica,
  (b) alumina, in an amount providing an alumina-to-silica weight ratio of 15/85 to 80/20,
  (c) rhenium or a compound of rhenium, in an amount of 0.3 to 5 weight percent, based on said catalyst, calculated as metal;
(B) A layered crystalline clay-type aluminosilicate substantially in the ammonia or hydrogen form, substantially free of any catalytic loading metal or metals, said aluminosilicate having, prior to drying and calcining of said catalyst, the empirical formula:

$$nSiO_2:Al_2O_3:mAB:xH_2O$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations, said aluminosilicate further being in particulate form and being dispersed through said matrix;

said catalyst being further characterized by an average pore diameter below 100 angstroms and a surface area above 200 square meters per gram.

3. A catalyst as in claim 2, in which said gel matrix further comprises at least one additional component selected from nickel, tungsten, titanium and the oxides and sulfides of nickel, tungsten and titanium.

4. A catalyst as in claim 3, wherein said additional component is titania.

5. A hydrocarbon conversion catalyst comprising:
(A) A porous xerogel comprising:
  (a) at least 15 weight percent silica,
  (b) alumina, in an amount providing an alumina-to-silica weight ratio of 15/85 to 80/20,
  (c) rhenium, in the form of the metal, oxide, sulfide or any combination thereof, in an amount of 0.3 to 5 weight percent, based on said catalyst, calculated as metal;
(B) A layered crystalline clay-type aluminosilicate, in an amount of 1 to 50 weight percent of said catalyst, said aluminosilicate being substantially in the ammonia or hydrogen form, and being substantially free of any catalytic loading metal or metals, said aluminosilicate having, prior to drying and calcining of said catalyst, the empirical formula:

$$nSiO_2:Al_2O_3:mAB:xH_2O$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said mineral being within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations, said aluminosilicate further being in the form of particles, said particles being dispersed through said xerogel;

said catalyst having an average pore diameter below 100 angstroms and a surface area above 200 square meters per gram.

6. A hydrotreating process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrotreating conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said feedstock, and recovering hydrotreated products from said reaction zone.

7. A process as in claim 6, wherein said hydrocarbon feedstock was previously hydrofined by being contacted in a separate hydrofining zone with hydrogen and a conventional hydrofining catalyst, under conventional hydrofining conditions.

8. A process as in claim 6, wherein at least a portion of the liquid effluent from said reaction zone is hydrocracked in a separate reaction zone in the presence of hydrogen and the catalyst of claim 1, at a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said portion of liquid effluent, and wherein hydrocracked products are recovered from said separate reaction zone.

9. A process as in claim 6, wherein a portion of the liquid effluent from said reaction zone is catalytically reformed.

10. A process as in claim 6, wherein a portion of the liquid effluent from said reaction zone is catalytically cracked.

11. A process as in claim 8, wherein a portion of the liquid effluent from said separate reaction zone is catalytically reformed.

12. A process as in claim 8, wherein a portion of the effluent from said separate reaction zone is catalytically cracked.

References Cited
UNITED STATES PATENTS

| | | | |
|---|---|---|---|
| 3,132,087 | 5/1964 | Kelley et al. | 208—60 |
| 3,140,253 | 7/1964 | Plank et al. | 208—120 |
| 3,236,762 | 2/1966 | Rabo et al. | 208—111 |
| 3,252,757 | 5/1966 | Grandquist | 208—120 |

DELBERT E. GANTZ, Primary Examiner

A. RIMENS, Assistant Examiner

U.S. Cl. X.R.

208—60, 89, 111, 120; 252—455

PO-1050
(5/69)

UNITED STATES PATENT OFFICE
CERTIFICATE OF CORRECTION

Patent No. 3,535,229      Dated October 20, 1970

Inventor(s) JOSEPH JAFFE and JAMES R. KITTRELL

It is certified that error appears in the above-identified patent and that said Letters Patent are hereby corrected as shown below:

Col. 16, line 62, "being within" should read

--being characterized by a $d_{001}$ spacing at said humidity within--

Signed and sealed this 31st day of August 1971.

(SEAL)
Attest:

EDWARD M. FLETCHER, JR.
Attesting Officer

WILLIAM E. SCHUYLER, JR.
Commissioner of Patents